(12) United States Patent
Guberman et al.

(10) Patent No.: US 6,586,350 B2
(45) Date of Patent: Jul. 1, 2003

(54) NET FOR PROTECTING PLANTS FROM LIGHT

(75) Inventors: Felix Guberman, Beer-Sheva (IL); Gal Elazar, Negev (IL); Maor Segal, Negev (IL)

(73) Assignee: Polysack Plastic Industries (R.A.C.S.) Ltd., Negev (IL)

( * ) Notice: Subject to any disclaimer, the term of this patent is extended or adjusted under 35 U.S.C. 154(b) by 115 days.

(21) Appl. No.: 09/828,891

(22) Filed: Apr. 10, 2001

(65) Prior Publication Data

US 2002/0028620 A1 Mar. 7, 2002

(30) Foreign Application Priority Data

Apr. 18, 2000 (IL) ................................................ 135736

(51) Int. Cl.$^7$ .............................. B32B 5/18; B32B 5/24
(52) U.S. Cl. ........................... 442/30; 442/32; 442/38; 442/41; 442/43; 442/44; 442/131; 442/132; 442/133; 442/304; 442/308; 442/309; 442/312; 442/313; 428/318.4
(58) Field of Search .............................. 442/30, 32, 38, 442/41, 131, 304, 308, 312, 309, 313, 43, 44, 133, 132; 428/318.4

(56) References Cited

U.S. PATENT DOCUMENTS

| 4,980,227 A | | 12/1990 | Sekiguchi et al. |
| 5,458,957 A | | 10/1995 | Fryszer et al. |
| 5,645,933 A | * | 7/1997 | Sakazume et al. .......... 428/134 |

FOREIGN PATENT DOCUMENTS

| JP | 6-153710 | | 6/1994 |
| JP | 07298793 | * | 11/1995 | ......... A01G/13/02 |
| JP | 10-327684 | | 12/1998 |

OTHER PUBLICATIONS

XP–002195939: Database WPI, Section Ch, Week 199715, Derwent Publications Ltd., abstract for KR9507511, "Apparatus Manufacture Light Shield Screen ginseng Field Comprise Raw Net Roll Synthetic Resin Flat Yarn Main Body Table Vertical Support Guide Roll Draw Roll", Kumsan Co (Jul. 11, 1995).
European Patent Office Patent Abstracts of Japan: Abstract for JP 07298793, "Light–Shielding Net", HEISEI Polymer Co Ltd, (Nov. 14, 1995).
European Patent Office Patent Abstracts of Japan: Abstract for JP 09172883, "Light–Shielding Net", Maruwa Biochem KK, (Jul. 8, 1997).
European Patent Office Patent Abstracts of Japan: Abstract for JP 10033067, "Covering Material for Agriculture", Diatex Co Ltd., (Feb. 10, 1998).
Patent Abstracts of Japan: Abstract for JP 06099668, "Filament for Artificial Lawn Pile Fabric", Hagiwara Kogyo, (Nov. 28, 1995).
Abstract for JP 54015844, 1977.
Abstract for JP 78041384, 1978.
Abstract for JP 5340074, 1994.

* cited by examiner

*Primary Examiner*—Elizabeth M. Cole
*Assistant Examiner*—Ula C Ruddock
(74) *Attorney, Agent, or Firm*—Browdy and Neimark, P.L.L.C.

(57) ABSTRACT

A net for diffusing light comprising threads of flat yarn, characterized in that the flat yarn has a layer comprising a foamed synthetic resin film capable of diffusing light passing therethrough. Also disclosed is a method for protecting plants from overexposure to sunlight comprising covering the plants with such a net.

7 Claims, No Drawings

NET FOR PROTECTING PLANTS FROM LIGHT

FIELD OF THE INVENTION

This invention relates to a net for use in protecting plants from direct sunlight.

BACKGROUND OF THE INVENTION

Although plants require sunlight in order to grow and thrive, different types of plants have differing requirements as to the amount and type of sunlight. Some plants thrive under direct sunlight, while others, sometimes termed shade plants, require filtered or dispersed light in order not to dry out and wither.

It has been known for many years to use shade-cloth or shading paint in order to protect shade plants from direct sunlight. In particular, white colored nets have been found to have a beneficial effect on the growth and agricultural yield of such plants. The white color reflects and disperses the light, while the net (as opposed to a film or sheet) allows aeration of the plant environment. Colors other than white may also be used in such applications.

The conventional technique for imparting a color to the net is by painting the net fabric using a mineral-based paint. For example, white colored nets are prepared using $TiO_2$. However, a major disadvantage of this method is in the abrasive effect of the mineral on the machinery used to produce the net, such as an extruder (when a polymeric fabric is used) and a knitting machine. Decreasing the amount of mineral used in coloring the fabric decreases the abrasive effect, but also decreases the percentage of shade afforded by the net. It is therefore quite difficult to strike a balance between obtaining a sufficient amount of shade from the net while at the same time preventing damage to the manufacturing equipment.

Foamed synthetic polymer resin films are well known for use in various agricultural and other applications.

JP 06099668, published Nov. 28, 1995, discloses a three-layer film comprising a polyolefin-based synthetic resin impregnated with a foaming agent. The film is cut into strips and stretched to obtain a flat yarn for use in preparing an artificial lawn pile fabric. In order to impart a visual appearance similar to a natural lawn, white luster is prevented by irregular reflection of light on the surface.

JP 54015844 published Feb. 6, 1979, discloses a laminated film which filters and scatters sunlight. The film comprises a foamed synthetic resin film having closed cells of 0.3–5 mm, laminated with a synthetic film coated with aluminum powder. The film may be used to cover a greenhouse.

JP 78041384 published Nov. 2, 1978, discloses a thermally-insulating laminated sheet which comprises a flexible cellular plastic sheet bonded to a reinforcing polyolefin fabric using an adhesive containing aluminum powder. The sheet is used to prevent escape of heat from a greenhouse and the adhesive layer reflects thermal radiation.

JP 5340074 published Dec. 21, 1993, discloses a high strength straw matting for covering the floor. The matting comprises a synthetic resin foaming body having a thickness of 2–5 mm formed as a tape reinforcing material laminated on the back of a synthetic resin made straw matting.

SUMMARY OF THE INVENTION

It is an object of the invention to provide a novel colored net capable of providing diffuse light to plants covered thereby and which is minimally abrasive to machinery used in its manufacture.

It is a still further object of the invention to provide a method for protecting plants from overexposure to direct sunlight by using a net which diffuses the sunlight.

In a first aspect, the present invention provides a net for diffusing light comprising threads of flat yarn, characterized in that the flat yarn has a layer comprising a foamed synthetic resin film capable of diffusing light passing therethrough.

The net of the invention provides maximum dispersion of light with minimal damage to the manufacturing machinery, due to the negligible amount of mineral-based paint. For example, a black-colored net having a texture which provides 50% shading allows approximately 50% of the original amount of direct or dispersed light to pass through it. On the other hand, a white net according to one embodiment of the invention which similarly provides 50% shading allows approximately 80% of dispersed light and 50% of direct light to pass through it. By increasing the percentage of dispersed light reaching the plants, an increase in photosynthesis is achieved without the plants being adversely affected by direct sunlight.

The net of the invention may be prepared either by knitting or by weaving. In the case of a knitted net, a typical net will comprise a plurality of threads oriented in a first direction and being essentially equal spaced from one another, and having wefts oriented in a second direction which is perpendicular to the first direction, the threads and wefts being interlocked by stitches. The wefts will generally comprise the flat yarn of the invention. The threads may be of similar composition to the wefts, or may be any mono-oriented synthetic resin. Such a net may preferably be prepared by a Raschel knitting method which is known "per se", in which the filaments are attached to knitting elements which comprise two needles and knock-over comb bars which are positioned opposite to one another, and comprising ground guide bars, pattern guide bars and stitch comb bars. An example of such a knitted net is described in European Patent No. 0 723 606, assigned to the Applicant, whose contents are incorporated herein by reference. In another embodiment, threads of flat yarn according to the invention are inserted into the knitted fabric.

In the case of a woven net, either the warp or the weft or both may have the characteristics of the flat yarn described above. In the present application, the term "weft" when used with respect to a woven net may refer either to the warp or to the weft, or to both.

The net is knitted or woven to a desired texture, depending on the percentage of shade required. The texture may be determined by the distance between the threads.

As stated above, the wefts consist of flat yarn. Flat yarn is characterized by a large ratio between the width and thickness of the yarn. Typical values for this ratio are 10:1 to 200:1. This provides a large surface area for light diffusion. In the case of a knitted net, the yarn must be of sufficient strength to be knitted. Preferred strength requirements are no less than 20 mN/Den tenacity and an elongation-at-break of between 10% and 60%. The yarn will preferably have a thickness in the range of 20–120μ and a width in the range of 0.5–5.0 mm.

The flat yarn may be mono-layered or multi-layered, with at least one foamed layer contributing the optical properties of the yarn (i.e. diffusion of light) and at least one layer contributing the mechanical properties (i.e. structural strength). In the case of a multi-layered yarn, the layers may be extruded together, or manufactured separately and subsequently bound together to form a laminate. The yarn may be manufactured by any of the known conventional methods. In the case of a mono-layered yarn, one layer will combine the optical and mechanical properties.

The synthetic resin film may be prepared from polymers such as polyolefins, polyesters, polyamides, polyimides and other polymeric film making substances, as well as mixtures of different polymers. Examples of polymers which may be used in the net of the invention include, but are not limited to, polypropylene and polyethylene.

As stated above, the synthetic resin contained in the flat yarn is foamed. Foams may be generated in synthetic plastic by a number of methods. These include, but are not limited to, the incorporation of a gas-generating agent in the resin film, expansion of small beads of thermoplastic resin containing a blowing agent, dispersion of gas by mechanical means, and incorporating an inorganic granule additive in the resin film followed by stretching of the film. A preferred size of the granules is 0.5–2.0μ. The stretching may be mono-oriented or bi-oriented. In a preferred embodiment, the aforementioned stretching method is used to prepare the foamed synthetic resin sheet for the net of the invention. The sheet may be manufactured, cut into strips for manufacture of the flat yarn and then stretched, or first stretched and then cut into strips. The cavities formed in the resin film contribute to the diffusion of the light. The resin film may be of any color other than black. In a preferred embodiment, the resin film imparts a white appearance to the yarn and net.

In order to impart mechanical strength to the yarn for the knitting or weaving process, at least one layer must be structurally strong, preferably by mono-oriented stretching. In the case of a multilayer yarn, the second layer may be made from the same materials listed above for the foamed synthetic resin. However, this second layer is not foamed, as the foaming generally weakens the mechanical strength of the resin. Most preferably, the second layer is a high-density polyolefin film such as mono-oriented, high-density polyethylene (HDPE). A preferred density of this layer is e.g. >0.9 gr/cm$^3$ for polypropylene and >0.94 gr/cm$^3$ for polyethylene. In the case of a mono-layered yarn, a balance must be achieved between foaming and stretching, as is known to the skilled man of the art.

At times it may be advisable to supplement the polymers with various chemical additives such as UV stabilizers and processing agents.

In a second aspect, the invention provides a method for protecting plants from overexposure to sunlight comprising covering the plants with a net according to the invention. The manner of covering the plants is well known to the skilled man of the art and depends on the type of plant, season, geographical area, texture of the net, etc. Use of the net of the invention instead of a black net in covering the plants can increase the amount of diffuse light reaching the plants, resulting in more intensive photosynthesis. The net of the invention may be used, for example, in a permanent rather than a seasonal spread, as opposed to a conventional black net.

DETAILED DESCRIPTION OF A PREFERRED EMBODIMENT

In order to assess the efficiency of a net prepared according to the invention (hereinafter "the diffusing net"), a comparative experiment was carried out in which the basil plant (*Ocimum basilicum*) was grown for a period of 2–3 months either under a diffusing net of white appearance or under a black net. Various parameters such as global radiation and plant growth were followed.

The diffusing net was a knitted net having wefts comprising a layer of foamed bi-oriented polypropylene laminated to a layer of mono-oriented HDPE. The black net was a knitted net of flat, black-colored yarn. Both nets had a fiber texture giving 50% shade and covered an area of 25 m$^2$.

The results in plant growth per plant are summarized in Table 1:

TABLE 1

| Parameters | Black net | Diffusing net | change |
| --- | --- | --- | --- |
| average fresh weight (gr) | 74.6 | 120 | +61 |
| shoot length (cm) | 34 | 41.2 | +21 |
| average no. of nodes in stem after cutting | 2.6 | 3.8 | +46 |
| thickness of stem after cutting (cm) | 0.44 | 0.51 | +16 |
| total number of stems | 17 | 19 | +12 |

It can be seen from the table that a significant improvement in the growth of the plants was observed using the diffusing net as opposed to the black net. As stated above, the diffusing net allows significantly more diffuse light to reach the plants than a conventional black net. The effect observed in the experiment is apparently due to the increased amount of dispersed light provided by the diffusing net.

Other modifications and embodiments of the invention will be apparent to the skilled man of the art on the basis of the above description. However, the scope of the invention is defined by the following claims.

What is claimed is:

1. A knitted net for diffusing light comprising threads of flat yarn, wherein said flat yarn has a layer comprising a foamed synthetic resin film capable of diffusing light passing therethrough, and said net has an inserted thread comprising said threads of flat yarn.

2. A woven net for diffusing light comprising threads of flat yarn, wherein said flat yarn has a layer comprising a foamed synthetic resin film capable of diffusing light passing therethrough, and wherein both the warp and the weft comprise said threads of flat yarn.

3. A net for diffusing light comprising threads of flat yarn, wherein said flat yarn has a layer comprising a foamed synthetic resin film capable of diffusing light passing therethrough, and wherein the foaming of said synthetic resin film is produced by incorporating in the resin film an inorganic granule additive of 0.5–2.0μ and bi-oriented stretching said resin film.

4. A net for diffusing light comprising threads of flat yarn, wherein said flat yarn has a layer comprising a foamed synthetic resin film capable of diffusing light passing therethrough, and wherein the foaming of said synthetic resin film is produced by the incorporation of a gas-generating agent in the resin film.

5. A net for diffusing light comprising threads of flat yarn, wherein said flat yarn has a layer comprising a foamed synthetic resin film capable of diffusing light passing therethrough, and wherein said foamed synthetic resin film has a white appearance.

6. A method for protecting plants from overexposure to sunlight comprising covering said plants with a net according to claim 5.

7. A method for increasing the amount of diffuse light reaching a plant, resulting in more intensive photosynthesis, comprising covering said plant with a net according to claim 5.

* * * * *